United States Patent [19]
Prunchak

[11] Patent Number: 5,629,247
[45] Date of Patent: May 13, 1997

[54] HIGH BISMUTH OXIDE BASED FLUX AND PAINT COMPOSITIONS FOR GLASS SUBSTRATES

[75] Inventor: Robert Prunchak, Beaver Falls, Pa.

[73] Assignee: The O'Hommel Company, Carnegie, Pa.

[21] Appl. No.: 643,281

[22] Filed: May 8, 1996

[51] Int. Cl.$^6$ .............................. C03C 3/066; C03C 8/04
[52] U.S. Cl. .................. 501/26; 501/18; 501/19; 501/20; 501/32; 501/79
[58] Field of Search ................... 501/17, 18, 19, 501/20, 26, 79, 32

[56] References Cited

U.S. PATENT DOCUMENTS

| | | |
|---|---|---|
| 4,285,731 | 8/1981 | Nigrin . |
| 4,311,504 | 1/1982 | Nigrin . |
| 4,409,292 | 10/1983 | Parant . |
| 4,493,900 | 1/1985 | Nishino et al. . |
| 4,537,862 | 8/1985 | Francel et al. . |
| 4,554,258 | 11/1985 | Francel . |
| 4,590,171 | 5/1986 | Nigrin . |
| 4,748,137 | 5/1988 | Nigrin . |
| 4,766,346 | 8/1988 | Weiss et al. . |
| 4,892,847 | 1/1990 | Reinherz . |
| 4,970,178 | 11/1990 | Klimas et al. . |
| 4,975,301 | 12/1990 | Andrews et al. . |
| 5,093,287 | 3/1992 | Borrelli et al. . |
| 5,096,620 | 3/1992 | Ditz et al. . |
| 5,137,851 | 8/1992 | Hormadaly et al. . |
| 5,200,369 | 4/1993 | Clifford et al. . |
| 5,203,902 | 4/1993 | Murkens . |
| 5,244,848 | 9/1993 | Clifford et al. . |
| 5,252,521 | 10/1993 | Roberts . |
| 5,261,398 | 11/1993 | Thometzek et al. . |
| 5,273,948 | 12/1993 | Yamazaki et al. . |
| 5,283,211 | 2/1994 | Aitken et al. . |
| 5,304,516 | 4/1994 | Clifford . |
| 5,308,803 | 5/1994 | Clifford et al. . |
| 5,346,651 | 9/1994 | Oprosky et al. ............... 501/26 |
| 5,346,863 | 9/1994 | Hikata et al. . |
| 5,346,866 | 9/1994 | Komma et al. . |
| 5,378,408 | 1/1995 | Carroll et al. . |
| 5,393,714 | 2/1995 | Thometzek et al. . |
| 5,439,852 | 8/1995 | Hormadaly . |
| 5,447,891 | 9/1995 | Spinosa et al. . |
| 5,468,695 | 11/1995 | Carroll et al. . |
| 5,504,045 | 4/1996 | Emlemdi et al. ............... 501/26 |
| 5,547,749 | 8/1996 | Chiba et al. .................. 501/19 |

*Primary Examiner*—Karl Group
*Attorney, Agent, or Firm*—Watov & Kipnes, P.C.

[57] ABSTRACT

A flux composition containing as a first component:

50 to 75% by weight $Bi_2O_3$;

15 to 25% by weight $SiO_2$;

4 to 10% by weight $B_2O_3$;

2 to 9% by weight ZnO;

1 to 4% by weight alkali oxide; and
optionally as a second component a compound selected from CaO, $ZrO_2$, MgO, SrO, $Al_2O_3$, $SnO_2$, $TiO_2$, BaO, $MoO_3$, $F_2$ and $Fe_2O_3$. The flux composition is typically used as a major component of a paint composition having minor portions of a pigment and liquid medium. The paint compositions are particularly suited for coating glass.

11 Claims, No Drawings

HIGH BISMUTH OXIDE BASED FLUX AND PAINT COMPOSITIONS FOR GLASS SUBSTRATES

FIELD OF THE INVENTION

The present invention is directed to a flux composition and a paint composition containing the same, in which the paint composition is useful for the coating of glass. The flux composition has a relatively high bismuth oxide content and a combination of other materials which provide a paint composition having excellent scratch resistance as well as acid and alkali resistance.

BACKGROUND OF THE INVENTION

Paint compositions especially adapted for the coating of glass require a number of specific properties for commercial acceptance. The paint compositions must have the required color and opacity, and the coatings made from such compositions must have suitable resistance to the environment. These include scratch resistance, and resistance to acids and alkalis. The paint compositions should also be readily usable in a variety of printing mediums including UV-curable, water-miscible, thermoplastic, and conventional screen printing mediums.

Traditional glass coatings utilize lead oxide as a major component of the flux. From an engineering standpoint, the presence of lead oxide is advantageous. It provides for a smooth surface, excellent gloss, and low melting temperatures. Since lead oxide is a very powerful flux component, it minimizes the need for auxiliary components such as alkali oxides. Generally, alkali oxides should be minimized because they tend to raise the coefficient of thermal expansion (CTE) of the glass. If the CTE of the coating surpasses that of the substrate (e.g. soda lime silicate glass), tensile stress of the coating is increased during the cooling stage of the firing process. Since glass is very weak in tension, elevated tensile stress leads to fracture or "crazing" of the glass.

Notwithstanding the advantages of lead oxide, the health and environmental hazards of lead oxide-containing materials favor their elimination and the development of suitable flux and paint compositions that are free of such materials. There is therefore a significant need in the art of coating glass substrates for lead oxide free coating compositions which are highly resistant to scratching, and corrosive materials such as acids and alkalis.

SUMMARY OF THE INVENTION

The present invention is directed to a flux composition for use in the preparation of paint compositions, which paint compositions are used to coat glass. Both the flux composition and the paint composition made therefrom are at least substantially lead oxide free and coatings made therefrom are highly resistant to scratching, as well as acids and alkalis.

More specifically, the flux composition of the present invention comprises a first component and an optional second component. The first component comprises from about 50 to 75% by weight $Bi_2O_3$; from about 15 to 25% by weight $SiO_2$; from about 4 to 10% by weight $B_2O_3$; from about 2 to 10% by weight ZnO; and from about 1 to 4% by weight alkali oxide, all weight percents based on the total weight of the flux composition.

The optional second component is at least one member selected from up to about 4% by weight CaO, up to about 4% by weight $ZrO_2$, up to about 3% by weight MgO, up to about 3% by weight SrO, up to about 3% by weight $Al_2O_3$, up to about 3% by weight $SnO_2$, up to about 2% by weight $TiO_2$, up to about 2% by weight BaO, up to about 2% by weight $MoO_3$, up to about 2% by weight $F_2$, and up to about 1% by weight $Fe_2O_3$; all weight percents based on the total weight of the flux composition. The total weight of the second component is typically up to about 20% by weight of the total flux composition.

The paint composition of the present invention comprises the flux composition as described above, pigment, a liquid medium, and optionally a metal powder.

DETAILED DESCRIPTION OF THE INVENTION

The paint composition of the present invention employs a flux composition, pigment, and a liquid medium suitable for forming a coatable composition for application to glass substrates. Glasses coated with the paint composition of the present invention have low glass transition temperatures (Tg) (e.g. from about 390° C. to 460° C.) while still maintaining a low coefficient of thermal expansion typically in the range of from about $70 \times 10^{-7}$ to $92 \times 10^{-7}$, preferably from about $75 \times 10^{-7}$ to $90 \times 10^{-7}$. In addition, coatings provided by the paint compositions of the present invention exhibit typical firing ranges of from about 1000° F. to 1300° F.

The flux composition contains a required first component made up of $Bi_2O_3$; $SiO_2$; $B_2O_3$; ZnO; and alkali oxide, and an optional second component selected from at least one of CaO, $ZrO_2$, MgO, SrO, $Al_2O_3$, $SnO_2$, $TiO_2$, BaO, $MoO_3$, $F_2$, and $Fe_2O_3$. The second component may be present in an amount of no more than about 20% by weight.

The first component of the present flux composition principally contains $Bi_2O_3$, preferably in an amount of from about 50 to 75% by weight, more preferably from about 60 to 65% by weight, still more preferably from about 60.9 to 63.5% by weight. A significant amount of $SiO_2$ is also present, preferably from about 15 to 25% by weight, more preferably from about 17 to 22% by weight, and most preferably from about 18.6 to 21% by weight. The third required material comprising the first composition of the flux composition is $B_2O_3$. $B_2O_3$ is typically present in an amount of from about 4 to 10% by weight, preferably from about 6 to 9% by weight, most preferably from about 6.8 to 8.6% by weight. ZnO, another required component, is typically present in an amount of from about 2 to 10% by weight, preferably from about 4 to 8% by weight, most preferably from about 4.9 to 7.7% by weight.

The last of the required members of the first component is an alkali oxide. Suitable alkali oxides include sodium oxide, potassium oxide, lithium oxide and mixtures thereof. Preferred alkali oxides are sodium oxide and potassium oxide. The amount of the alkali oxide is typically from about 1 to 4% by weight, preferably from about 1.6 to 3% by weight and most preferably from about 1.7 to 2.2% by weight.

The second component is present in amounts of up to 20% by weight and includes at least one compound selected from the group consisting of CaO, $ZrO_2$, MgO, SrO, $Al_2O_3$, $SnO_2$, $TiO_2$, BaO, $MoO_3$, $F_2$, and $Fe_2O_3$. When present, each of CaO and $ZrO_2$ are present in amounts of up to about 4% by weight. MgO, SrO, $Al_2O_3$, and $SnO_2$ can each independently be present in the flux composition in amounts of up to about 3% by weight. $TiO_2$, BaO, $MoO_3$, and $F_2$, if present, are each independently present in amounts of up to about 2% by weight. Finally, $Fe_2O_3$ may be present in the second component in an amount of up to about 1% by weight, based on the total weight of the flux composition.

The preferred amounts of the compounds of the second component include up to 3.5% by weight of $ZrO_2$, up to 3.0% by weight of CaO, up to 2.5% by weight of each of MgO, SrO, $Al_2O_3$, and $SnO_2$, up to 1.75% by weight of each of $TiO_2$, BaO and $MoO_3$, up to 1.25% by weight of $F_2$ and up to 0.75% by weight of $Fe_2O_3$.

The amount of the flux composition is typically from about 65 to 80% by weight of the paint composition, preferably in the range of from about 70 to 75% by weight.

The paint composition of the present invention further contains at least one pigment, a compatible liquid medium and optionally a metal powder.

The pigments employed in the present invention may of any color, such as black or gray pigmented oxides. Examples include cobalt iron chrome black pigment, cobalt chrome alumina pigment and the like, including DuPont R 900 Rutile $TiO_2$ (manufactured by DuPont) and O.Hommel BL-115 and BK-704 (manufactured by O.Hommel Company). The pigments are typically employed in an amount of from about 2 to 25% by weight, preferably 5 to 10% by weight, based on the total weight of the paint composition.

The liquid medium employed to produce the paint composition is selected depending on the purpose to which the paint composition is to be used. The liquid medium can be selected depending on whether the paint composition is to be UV-curable, water miscible, thermoplastic and the like. For example, the liquid medium may comprise oil and resins of the type described, for example, in R. Andrews et al., U.S. Pat. No. 4,975,301, incorporated herein by reference. The amount of the liquid medium is typical from about 10 to 30% by weight, preferably from about 15 to 25% by weight of the paint composition.

The present paint composition may optionally include at least one metal powder. The preferred metal powders are aluminum, zinc and magnesium. Aluminum is the most preferred metal powder. The amount of the metal powder employed is typically in the range of from about 1 to 7% by weight based on the total weight of the paint composition, most preferably from about 1.5 to 3.0% by weight.

The presence of the metal powder, particularly aluminum improves the scratch resistance of the coated glass. In addition, the metal powder shows excellent silver bleed-through prevention. Often it is advantageous for the glass manufacturer to print a conductive silver paint over top of the black paint. The silver paint may be used as a defroster grid or radio antennae depending on the composition. It has been observed that the use of from about 1 to 7% by weight based on the total weight of the paint composition, of finely divided aluminum metal, zinc metal or magnesium metal or a mixture thereof, prevents the staining effect or discoloration normally observed when over printing with silver. The exact role that the metals play in preventing this discoloration is not currently understood. Furthermore, the presence of metal powder reduces the tendency of the glass to stick to the mold during the glass forming process. It has also been observed that minor additions of these three metals individually or as a mixture help prevent sticking to refractory molds that can be used during the forming process.

The paint composition is typically prepared by combining the powdered components of the flux composition and pigment and optional metal powder together with the liquid medium. The dry powders are mixed with the liquid medium to initiate wetting thereof. The mixture is then introduced into a colloid mill or three roll mill until a suitable dispersion for coating is obtained.

The paint compositions described above are adjusted to proper printing viscosity with the addition of small amounts of liquid medium which is mixed in as needed. The paints are then applied to glass substrates by any of the typical printing methods known in the art. Screen printing is especially suitable for applying the paint composition to the glass substrate. The coated glass is then cured (dried) and fired within a temperature range typically from about 1000° to 1300° F. thus producing a permanent coating. Printing viscosities are tailored to the process, i.e. depending on screen choice, squeegee pressure, print speed, art work detail, and the like.

The following examples are for illustrative purposes only and are not intended to limit the invention as encompassed by the claims forming part of the application.

EXAMPLE 1

100 grams of a flux composition is blended according to each of the compositions set out below.

| Compound | Flux #1 (g) | Flux #2 (g) | Flux #3 (g) |
| --- | --- | --- | --- |
| $Bi_2O_3$ | 63.36 | 60.95 | 63.14 |
| $SiO_2$ | 19.79 | 20.94 | 18.64 |
| $B_2O_3$ | 7.76 | 6.82 | 8.59 |
| ZnO | 4.95 | 7.62 | 4.93 |
| $Na_2O$ | 1.22 | 0.88 | 1.26 |
| $K_2O$ | 0.92 | 0.89 | 0.92 |
| $ZrO_2$ | 2.00 | 1.90 | 1.33 |
| $F_2$ | 0.00 | 0.00 | 1.19 |
| Total | 100.00 | 100.00 | 100.00 |

The flux composition in the form of a powder is produced by conventional means. The various materials are mixed and smelted to produce a uniform glass. This glass is then quenched via traditional methods and the result is then ground to a fine particle size. Grinding yields a powder that passes through a 325 mesh screen (44 μm).

EXAMPLE 2

100 g of each of a white, black, and blue paint composition of the invention were prepared according to the formulations set forth in the table below.

| | Material | White (g) | Black (g) | Blue (g) |
| --- | --- | --- | --- | --- |
| (a) | Flux | | | |
| | Flux #1 | 72 | 72 | 73 |
| (b) | Pigment Composition | | | |
| | DuPont R900 Rutile $TiO_2$ | 7 | 0 | 0 |
| | O. Hommel BL-115 | 0 | 8 | 0 |
| | O. Hommel BK-704 | 0 | 0 | 8 |
| (c) | Liquid Medium | | | |
| | L-422 medium | 21 | 20 | 19 |
| | Total | 100 | 100 | 100 |

In each composition, the powdered components were blended together and then introduced into a colloid mill or three roll along with the liquid components until a uniform dispersion was obtained.

EXAMPLE 3

The paint compositions described in Example 2 were adjusted to proper printing viscosity with the addition of small amounts of liquid medium. The paints were screen printed onto windshield glass to produce a uniform coating. The coated glass was then cured (dried) and fired at a temperature of 1150° F., producing a permanent coating having excellent scratch resistance and resistance to acid and alkali.

I claim:

1. A flux composition comprising a first component comprising:

from about 50 to 75% by weight $Bi_2O_3$;
from about 15 to 25% by weight $SiO_2$;
from about 4 to 10% by weight $B_2O_3$;
from about 2 to 10% by weight ZnO; and
from about 1 to 4% by weight alkali oxide, wherein all weight percents are based on the total weight of the flux composition.

2. The flux composition of claim 1 wherein said first component comprises:

from about 60 to 65% by weight $Bi_2O_3$;
from about 17 to 22% by weight $SiO_2$;
from about 6 to 9% by weight $B_2O_3$;
from about 4 to 8% by weight ZnO; and
from about 1.6 to 3% by weight alkali oxide.

3. The flux composition of claim 1 comprising:

from about 60.9 to 63.5% by weight $Bi_2O_3$;
from about 18.6 to 21% by weight $SiO_2$;
from about 6.8 to 8.6% by weight $B_2O_3$;
from about 4.9 to 7.7% by weight ZnO; and
from about 1.7 to 2.2% by weight alkali oxide.

4. The flux composition of claim 1 further comprising a second component which comprises at least one member selected from the group consisting of:

up to about 4% by weight CaO,
up to about 4% by weight $ZrO_2$,
up to about 3% by weight MgO,
up to about 3% by weight SrO,
up to about 3% by weight $Al_2O_3$,
up to about 3% by weight $SnO_2$,
up to about 2% by weight $TiO_2$,
up to about 2% by weight BaO,
up to about 2% by weight $MoO_3$,
up to about 2% by weight $F_2$, and
up to about 1% by weight $Fe_2O_3$;

all weight percents being based on the total weight of the flux composition, and said second component being present in an amount up to about 20% by weight of said flux composition.

5. The flux composition of claim 4 wherein said second component comprises at least one member selected from the group consisting of up to about 3% by weight CaO,
up to about 3.5% by weight $ZrO_2$,
up to about 2.5% by weight MgO,
up to about 2.5% by weight SrO,
up to about 2.5% by weight $Al_2O_3$,
up to about 2.5% by weight $SnO_2$,
up to about 1.75% by weight $TiO_2$,
up to about 1.75% by weight BaO,
up to about 1.75% by weight $MoO_3$,
up to about 1.25% by weight $F_2$, and
up to about 0.75% by weight $Fe_2O_3$.

6. The flux composition of claim 1 wherein said alkali metal oxide is selected from sodium oxide and potassium oxide.

7. A paint composition, comprising a flux composition, a pigment and a liquid medium, said flux composition comprising a first component comprising;

from about 50 to 75% by weight $Bi_2O_3$;
from about 15 to 25% by weight $SiO_2$;
from about 4 to 10% by weight $B_2O_3$;
from about 2 to 10% by weight ZnO; and
from about 1 to 4% by weight alkali oxide, wherein all weight percents are based on the total weight of the flux composition.

8. The paint composition of claim 7 comprising said flux composition in an amount of from about 65 to 80% by weight, said pigment in an amount of from about 2 to 25% by weight, and said liquid medium in an amount of from about 10 to 30% by weight, based on the total weight of the paint composition.

9. The paint composition of claim 8 comprising from about 70 to 75% by weight of said flux composition, from about 5 to 10% by weight of said pigment, and from about 15 to 25% by weight of said liquid medium.

10. The paint composition of claim 7 further comprising a metal powder.

11. The paint composition of claim 10 comprising from about 1 to 7% by weight of the metal powder based on the total weight of the paint composition.

* * * * *